(12) United States Patent
Penven

(10) Patent No.: US 12,535,187 B2
(45) Date of Patent: Jan. 27, 2026

(54) DOUBLE-SKIN CRYOGENIC TANK EQUIPPED WITH AT LEAST ONE INSPECTION DEVICE

(71) Applicant: Airbus Operations SAS, Toulouse (FR)

(72) Inventor: Benoît Penven, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 230 days.

(21) Appl. No.: 18/463,006

(22) Filed: Sep. 7, 2023

(65) Prior Publication Data

US 2024/0093838 A1 Mar. 21, 2024

(30) Foreign Application Priority Data

Sep. 16, 2022 (FR) ...................................... 2209374

(51) Int. Cl.
*F17C 13/06* (2006.01)
*F17C 13/00* (2006.01)
*F17C 13/04* (2006.01)

(52) U.S. Cl.
CPC ............ *F17C 13/04* (2013.01); *F17C 13/001* (2013.01); *F17C 13/06* (2013.01); *F17C 2205/0382* (2013.01)

(58) Field of Classification Search
CPC .. F17C 13/001; F17C 13/06; F17C 2203/032; F17C 2203/0391; F17C 2203/0629; F17C 2205/0311; F17C 2260/015
See application file for complete search history.

(56) References Cited

U.S. PATENT DOCUMENTS 2,777,295 A * 1/1957 Bliss ...................... F17C 3/022
52/220.8
4,582,221 A * 4/1986 Lamb ..................... B65D 88/54
220/601
(Continued)

FOREIGN PATENT DOCUMENTS

EP 0120777 B1 9/1987
KR 20220134282 A * 10/2022 .............. F17C 3/085
(Continued)

OTHER PUBLICATIONS

Machine translation KR 20220134282.*
(Continued)

*Primary Examiner* — Kevin F Murphy
(74) *Attorney, Agent, or Firm* — Greer, Burns & Crain, Ltd.

(57) ABSTRACT

A tank including interior and exterior skins separated by an intercalated zone and at least one inspection device. The inspection device includes a first orifice configured to establish communication between the interior zone of the tank and the intercalated zone via the interior skin, configured to be blocked by a first plug, a second orifice configured to establish communication between the intercalated zone and the exterior zone of the tank via the exterior skin, configured to be blocked by a second plug, the first and second orifices being aligned in a radial direction, an intercalated pipe connecting the interior and exterior skins, communicating with the first and second orifices and including a bellows configured to be deformed in the radial direction.

14 Claims, 4 Drawing Sheets

(56) References Cited

U.S. PATENT DOCUMENTS

| | | | |
|---|---|---|---|
| 7,395,671 B2* | 7/2008 | Miki | F17C 1/00 62/51.1 |
| 9,822,931 B2* | 11/2017 | Harper | F17C 13/002 |
| 2021/0239274 A1 | 8/2021 | Ramirez Dala | |

FOREIGN PATENT DOCUMENTS

| RU | 2002991 C1 | 11/1993 |
|---|---|---|
| RU | 1031274 C * | 12/1995 |

OTHER PUBLICATIONS

Machine translation RU 1031274.*
French Search Report for corresponding French Patent Application No. 2209374 dated Apr. 20, 2023; priority document.

* cited by examiner

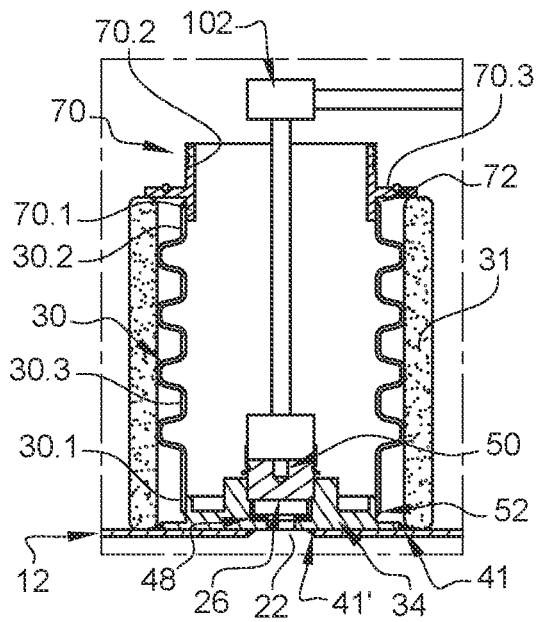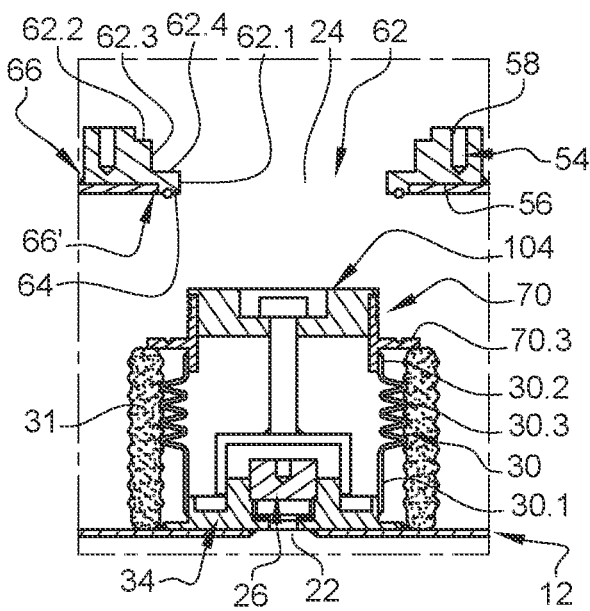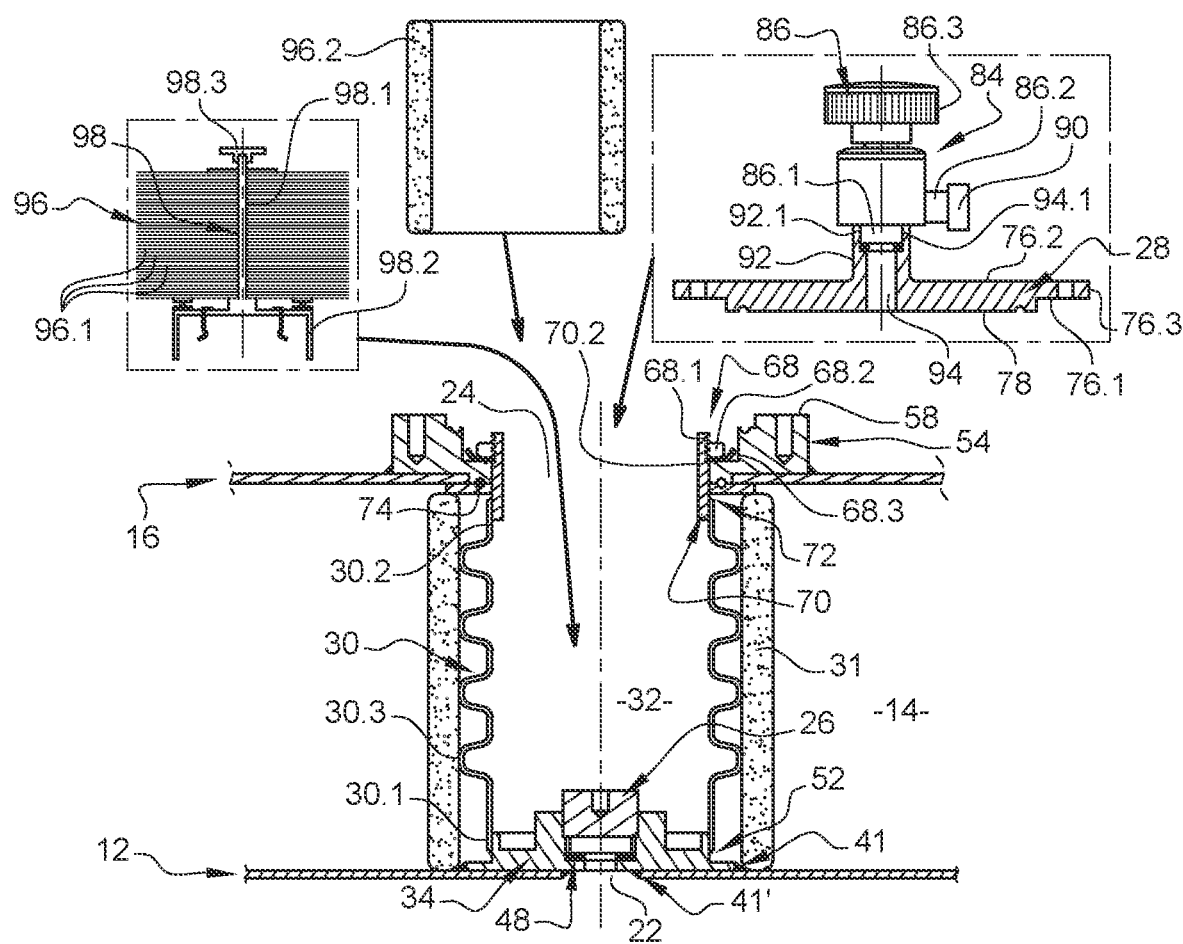

DOUBLE-SKIN CRYOGENIC TANK EQUIPPED WITH AT LEAST ONE INSPECTION DEVICE

CROSS-REFERENCES TO RELATED APPLICATIONS

This application claims the benefit of the French patent application No. 2209374 filed on Sep. 16, 2022, the entire disclosures of which are incorporated herein by way of reference.

FIELD OF THE INVENTION

The present application relates to a double-skin cryogenic tank equipped with at least one inspection device.

BACKGROUND OF THE INVENTION

In accordance with one embodiment, a tank configured to store a product at a cryogenic temperature comprises from the interior toward the exterior a rigid interior skin, an insulation such as a multilayer insulation (MLI), and a rigid exterior skin. A vacuum on the order of 10-7 to 10-11 bar is produced between the interior and exterior skins. This configuration enables excellent performance to be obtained in terms of thermal insulation.

In accordance with one application, a tank of this kind is used to store hydrogen in an aircraft and comprises at least one outlet orifice enabling communication to be established between the interior of the tank and an outlet pipe that feeds with hydrogen at least one item of equipment (fuel cells, turbojets, etc.). The outlet pipe is a double-skin pipe connected to the tank by a relatively complex connection system guaranteeing an optimum fluid seal and optimum thermal insulation at the level of the junction of the outlet pipe and the tank.

In use, the interior of the tank must be inspected using an endoscopic video camera in order to verify the integrity of the tank. One solution for introducing the endoscopic video camera into the tank consists in separating the outlet pipe from the tank in order to introduce the video camera via the outlet orifice of the tank. This solution is not entirely satisfactory because the connection system is relatively complex to demount and to remount and limits access to the interior of the tank because of its position, which is not necessarily optimized for inspection.

The present invention aims to remedy some or all of the disadvantages of the prior art.

SUMMARY OF THE INVENTION

To this end, the invention has for an object a tank comprising an interior skin, an exterior skin and an intercalated zone between the interior and exterior skins, the interior and exterior skins delimiting an interior zone in contact with the interior skin and an exterior zone in contact with the exterior skin.

In accordance with the invention the tank includes at least one inspection device including:
  a first orifice configured to establish communication between the interior zone and the intercalated zone via the interior skin,
  a second orifice configured to establish communication between the intercalated zone and the exterior zone via the exterior skin, the first and second orifices being aligned in a radial direction,
  a first plug configured to occupy a mounted first state in which the first plug prevents any flow through the first orifice and a demounted second state in which the first plug enables access through the first orifice,
  a second plug configured to occupy a mounted first state in which the second plug prevents any flow through the second orifice and a demounted second state in which the second plug enables access through the second orifice,
  an intercalated pipe positioned in the intercalated zone, having a first end section connected to the interior skin and communicating with the first orifice, a second end section connected to the exterior skin and communicating with the second orifice, and an intercalated section forming a bellows configured to be deformed in the radial direction.

The inspection device provides a simple manner for inspecting the interior of the tank without it being necessary to demount the connection system of the outlet pipe from the tank. It also makes it possible not to degrade the seal and the thermal insulation of the tank. Finally, the bellows of the intercalated pipe enables compensation of dimensional variations between the interior and exterior skins in operation because of the different temperatures of the interior and exterior skins.

In accordance with another feature, the inspection device comprises at least one insulation positioned in a passage zone delimited by the intercalated pipe.

In accordance with another feature, the inspection device includes a mobile support to which the insulation is connected configured to insert the insulation in the passage zone or to extract it therefrom.

In accordance with another feature, the inspection device includes a demountable connection configured to connect the mobile support to the first plug and/or to a first support fastened to the interior skin.

In accordance with another feature, the inspection device includes a purging system configured to control the pressure in a passage zone delimited by the intercalated pipe and the first and second plugs in the mounted first state.

In accordance with another feature, the purging system includes a valve having an inlet that communicates with the passage zone when the second plug occupies the mounted first state, an outlet and a control member configured to control a flow of fluid between the inlet and the outlet.

In accordance with another feature, the inspection device includes a permanent sealed connection connecting the intercalated pipe and a first support fastened to the interior skin or the interior skin and a sealed demountable connection connecting the intercalated pipe and second support fastened to the exterior skin or the exterior skin.

In accordance with another feature, the interior wall of the tank has an internal face oriented toward the interior zone and an external face oriented toward the intercalated zone, the first support is connected by at least one permanent sealed connection to the interior skin and has a first transverse face pressed against the external face of the interior skin, a second transverse face opposite the first transverse face, a lateral surface including at least one section configured to cooperate with the first end section of the intercalated pipe, and a first through-orifice discharging at the level of the first and second transverse faces, communicating with the first orifice and configured to cooperate with the first plug.

In accordance with another feature, the first through-orifice has a first section discharging at the level of the first transverse face, a second section discharging at the level of the second transverse face which has a diameter greater than that of the first section, and a transverse bearing face connecting the first and second sections. Additionally, the first plug includes a cylindrical body extending between first and second end faces connected by a lateral face configured to cooperate with the second section of the first through-orifice of the first support, the first end face being oriented toward the transverse bearing face of the first through-orifice when the first plug is in the mounted first state, the inspection device including an annular seal intercalated between the first end face of the first plug and the transverse bearing face of the first through-orifice of the first support.

In accordance with another feature, the second section of the first through-orifice is threaded. Additionally, the lateral face of the first plug has a first section adjacent to the first end face that has a greater diameter than the first section of the first through-orifice and a smaller diameter than the second section of the first through-orifice and a second section adjacent to the second end face, at least partially threaded and configured to be screwed into the second section of the first through-orifice.

In accordance with another feature, the second section of the lateral face includes an annular groove to enable an element to be clipped on.

In accordance with another feature, the first plug includes an imprint at the level of the second end face to enable it to be screwed into the first through-orifice.

In accordance with another feature, the exterior skin has an internal face oriented toward the intercalated zone and an external face oriented toward the exterior zone, the second support is connected by at least one sealed permanent connection to the exterior skin and has a first transverse face pressed against the external face of the exterior skin, a second transverse face opposite the first transverse face, and a second through-orifice discharging at the level of the first and second transverse faces and communicating with the second orifice, the second plug being configured to be pressed against the second transverse face and connected to the second support by a sealed demountable connection.

In accordance with another feature, the second through-orifice includes a first section at the level of the first transverse face and a second section having a diameter greater than that of the first section configured to accommodate the sealed and demountable connection and a transverse bearing face connecting the first and second sections. Additionally, the intercalated pipe has a tubular extension including a tubular portion configured to be accommodated at least partially in the second orifice, the sealed demountable connection including a thread at the level of the tubular portion of the tubular extension of the intercalated pipe and a nut configured to be screwed onto the tubular portion of the tubular extension and to bear against the transverse bearing face of the second support.

In accordance with another feature, the tubular extension includes a first tubular portion cooperating with the second end section of the intercalated pipe, a second tubular portion cooperating with the nut of the sealed demountable connection, and a ring configured to be pressed against the second support, the sealed demountable connection including a seal intercalated between the ring and the second support.

BRIEF DESCRIPTION OF THE DRAWINGS

Other features and advantages will emerge from the following description of the invention given by way of example only with reference to the appended drawings, in which:

FIG. 3 is a view in section of a part of the inspection device visible in FIG. 2 depicting a first assembly step, FIG. 4 is a view in section of a part of the inspection device visible in FIG. 2 depicting a second assembly step, FIG. 5 is a view in section of a part of the inspection device visible in FIG. 2 depicting a third assembly step.

DETAILED DESCRIPTION OF THE PREFERRED EMBODIMENTS

Figure 1:
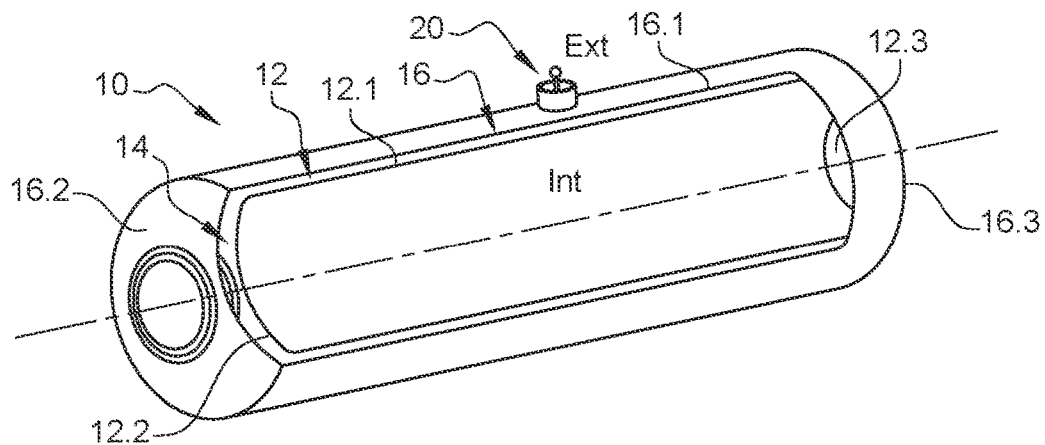
FIG. 1 is a partially cutaway perspective view of a double-skin tank.
Figure 2:
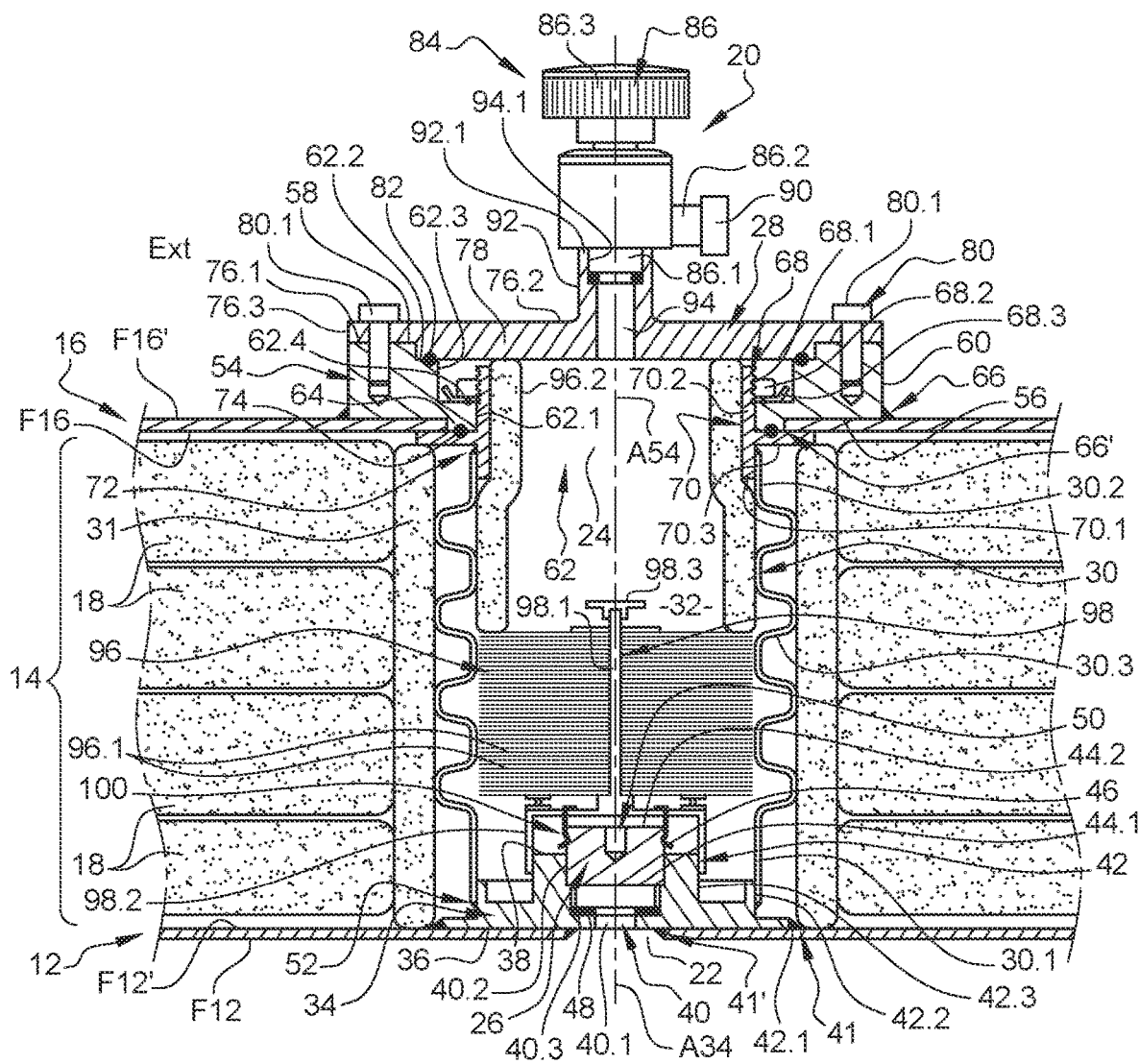
FIG. 2 is a cross section of a part of a tank equipped with an inspection device illustrating one embodiment of the invention.

In accordance with an embodiment visible in FIGS. 1 and 2 a tank 10 configured to store a product at a cryogenic temperature comprises a rigid interior skin 12, an intercalated zone 14 and a rigid exterior skin 16 positioned around the interior skin 12. The tank 10 delimits an interior zone Int in contact with the interior skin 12 and an exterior zone Ext in contact with the exterior skin 16. The interior skin 12 has an internal face F12 oriented toward the interior zone Int of the tank 10 and an external face F12' oriented toward the intercalated zone 14. The exterior skin 16 has an internal face F16 oriented toward the intercalated zone 14 and an external face F16' oriented toward the exterior zone Ext of the tank 10.

To reinforce the thermal insulation at least one multilayer insulation (MLI) 18 is positioned in the intercalated zone 14. For example, the insulation 18 comprises a plurality of layers stacked on one another from the interior skin 12 to the exterior skin 16. The invention is not limited to this type of insulation. Additionally, the intercalated zone 14 contains a vacuum on the order of 10-7 to 10-11 bar.

In accordance with one configuration, each of the interior and exterior skins 12, 16 includes a cylindrical central part 12.1, 16.1 and two dome-shaped end walls 12.2, 12.3, 16.2, 16.3 connected in sealed manner to the ends of the cylindrical central part 12.1, 16.1. Of course, the invention is not limited to this geometry of the tank 10.

In accordance with one application, a tank of this kind is used to store hydrogen in an aircraft and includes at least one outlet orifice enabling communication to be established between the interior of the tank and an outlet pipe. Of course, the invention is not limited to this application.

As depicted in FIG. 2, the tank 10 is equipped with at least one inspection device 20. In accordance with one configuration, the inspection device 20 is positioned in the cylindrical central parts 12.1, 16.1 of the interior and exterior skins 12, 16. Of course, the tank 10 may include a plurality of inspection devices 20 not all of which are necessarily positioned in the cylindrical central parts 12.1, 16.1. Thus, an inspection device may be positioned in one of the end walls 12.2, 12.3, 16.2, 16.3.

The inspection device 20 includes a first orifice 22 configured to establish communication between the interior zone Int and the intercalated zone 14 via the interior skin 12, a second orifice 24 configured to establish communication between the intercalated zone 14 and the exterior zone Ext via the exterior skin 16, the first and second orifices 22, 24 being substantially aligned in a radial direction perpendicular to the interior or exterior skin 12, 16, a first plug 26 configured to occupy a mounted first state in which it prevents any flow through the first orifice 22 and a demounted second state in which it enables access via the first orifice 22, a second plug 28 configured to occupy a mounted first state in which it prevents any flow through the second orifice 24 and a demounted second state in which it enables access via the second orifice 24, and an intercalated pipe 30 positioned in the intercalated zone 14 having a first end section 30.1 connected directly or indirectly to the interior skin 12 and communicating with the first orifice 22, a second end section 30.2 connected directly or indirectly to the exterior skin 16 and communicating with the second orifice 24, and an intercalated section 30.3 forming a bellows configured to be deformed in the radial direction and possibly in a direction perpendicular to the radial direction in order to compensate any axial offset between the first and second orifices 22, 24. Thus, the intercalated pipe 30 is configured to occupy a first state in which it has a first dimension in the radial direction and a second state in which it has a second dimension in the radial direction less than the first dimension. The bellows of the intercalated section 30.3 is configured to obtain a reduction of length between the first and second dimensions of at least 20%.

In accordance with one configuration, to reinforce the seal, a tubular insulation 31 is intercalated between the intercalated pipe 30 and the layers of the insulation 18 provided in the intercalated zone 14. For example, this tubular insulation 31 is an MLI type insulation.

In accordance with one configuration, the first state is a rest state. In the absence of stresses the intercalated pipe 30 therefore occupies the first state. The intercalated pipe 30 is configured to be deformed elastically in the presence of a compression stress tending to compress it to go from the first state to the second state. As soon as the compression stress is removed, the intercalated pipe 30 reverts automatically to the first state.

In accordance with one embodiment, the intercalated pipe 30 is made of metal, such as stainless steel or titanium alloy, for example.

This intercalated pipe 30 provided with a bellows enables compensation in operation of dimensional variations between the interior and exterior skins 12, 16 caused by the temperature difference between the interior and exterior skins 12, 16.

When the first and second plugs 26, 28 are each in the mounted first state they delimit with the intercalated pipe 30 a passage zone 32. When the first and second plugs 26, 28 are each in the demounted second state, the passage zone 32 enables communication to be established between the interior zone Int of the tank 10 and the exterior zone Ext.

The intercalated pipe 30 being directly or indirectly connected to each of the interior and exterior skins 12, 16 in sealed manner, demounting the first and second plugs 26, 28 to carry out an inspection has no influence on the level of vacuum in the intercalated zone 14 outside the intercalated pipe 30.

In accordance with one embodiment, the inspection device 20 includes a first support 34 fastened to the interior skin 12 and configured to receive the first plug 26.

This first support 34 has a circular shape about a revolution axis A34. It has a first transverse face 36 (approximately perpendicular to the revolution axis A34) pressed against the external face F12' of the interior skin 12, a second transverse face 38 (approximately perpendicular to the revolution axis A34) opposite the first transverse face 36, and a first through-orifice 40 discharging on the first and second transverse faces 36, 38, communicating with the first orifice 22 and having an axis coinciding with the revolution axis A34. The first transverse face 36 has a curvature identical to that of the external face F12' of the interior skin 12. The first support 34 is positioned in such a manner that the first through-orifice 40 is substantially coaxial with the first orifice 22.

In accordance with one configuration the first support 34 has a lateral surface 42 that includes at least one section configured to cooperate with the first end section 30.1 of the intercalated pipe 30. In accordance with one embodiment the lateral surface 42 of the first support 34 includes first, second and third cylindrical sections 42.1, 42.2, 42.3 having staggered diameters, the first cylindrical section 42.1 adjacent to the first transverse face 36 having a greater diameter than the second cylindrical section 42.2 that itself has a greater diameter than the third cylindrical section 42.3 adjacent to the second transverse face 38.

The first through-orifice 40 is configured to cooperate with the first plug 26. It includes a first section 40.1 discharging on the first transverse face 36, a second section 40.2 discharging on the second transverse face 38 that has a diameter greater than that of the first section 40.1, and a transverse bearing face 40.3 connecting the first and second sections 40.1, 40.2. The first section 40.1 has a diameter less than that of the first orifice 22.

The first support 34 is connected to the interior skin 12 by at least one sealed permanent connection 41. In accordance with one configuration the first support 34 is connected to the interior skin 12 by a first peripheral weld bead 41 connecting the first cylindrical section 42.1 of the first support 34 and the external face F12' of the interior skin 12 and by a second peripheral weld bead 41' connecting the edge of the first orifice 22 and the first transverse face 36 of the first support 34. Of course, other solutions may be envisaged for connecting the first support 34 and the interior skin 12 in sealed manner. Alternatively, the first support 34 and the interior skin 12 are in one piece.

The first plug 26 has a cylindrical body that extends between first and second end faces 44.1, 44.2 connected by a lateral face 46 configured to cooperate with the second section 40.2 of the first through-orifice 40 of the first support 34. In accordance with one arrangement the first end face 44.1 is oriented toward the transverse bearing face 40.3 of the first through-orifice 40 when the first plug is in the mounted first state.

In accordance with one configuration, the second section 40.2 of the first through-orifice 40 is threaded and the lateral face 46 of the first plug 26 has a first section adjacent to the first end face 44.1 that has a greater diameter than the first section 40.1 of the first through-orifice 40 and a smaller diameter than the second section 40.2 of the first through-orifice 40 and a second section adjacent to the second end face 44.2 that is at least partly threaded and configured to be screwed into the second section 40.2 of the first through-orifice 40. In accordance with one embodiment the second section of the lateral face 46 includes an annular groove to enable an element to be clipped on.

To guarantee the seal between the first plug 26 and the first support 34, the inspection device includes an annular seal 48 intercalated between the first end face 44.1 of the first plug 26 and the transverse bearing face 40.3 of the first through-orifice 40 of the first support 34. This annular seal 48 is compatible with the product stored in the tank 10.

The first plug 26 includes a recessed imprint 50 at the level of the second end face 44.2 to enable it to be screwed into the first through-orifice 40. In accordance with one configuration the imprint 50 has a hexagonal section.

In accordance with one embodiment, the inspection device 20 includes a sealed permanent connection 52 connecting the first end section 30.1 of the intercalated pipe 30 and the first support 34 or the interior skin 12. In accordance with one configuration the first end section 30.1 of the intercalated pipe 30 is fitted around the second cylindrical section 42.2 of the first support 34 and connected to the latter by a sealed peripheral weld.

Of course, the invention is not limited to this embodiment of the first support 34 and the first plug 26.

In accordance with one embodiment, the inspection device 20 includes a second support 54 fastened to the exterior skin 16 and configured to receive the second plug 28.

This second support 54 has a circular shape around a revolution axis A54. It has a first transverse face 56 (approximately perpendicular to the revolution axis A54) pressed against the external face F16' of the exterior skin 16, a second transverse face 58 (approximately perpendicular to the revolution axis A54) opposite the first transverse face 56, a cylindrical lateral face 60 and a second through-orifice 62 discharging on the first and second transverse faces 56, 58, communicating with the second orifice 24 and having an axis coinciding with the revolution axis A54. The first transverse face 56 has a curvature identical to that of the external face F16' of the exterior skin 16. The second support 54 is positioned in such a manner that the second through-orifice 62 is substantially coaxial with the second orifice 24.

In accordance with one configuration, the first transverse face 56 includes a cylindrical boss 64 configured to be housed in the second orifice 24 and having a diameter substantially equal to that of the second orifice 24. This boss 64 enables centering of the second support 54 relative to the second orifice 24.

The second support 54 is connected to the exterior skin 16 by at least one sealed permanent connection 66. In accordance with one configuration, the second support 54 is connected to the exterior skin 16 by a first peripheral weld bead 66 connecting the cylindrical lateral face 60 of the second support 54 and the external face F16' of the exterior skin 16 and by a second peripheral weld bead 66' intercalated between the boss 64 and the second orifice 24. Of course, other solutions can be envisaged for connecting the second support 54 and the exterior skin 16 in sealed manner. Alternatively, the second support 54 and the exterior skin 16 are in one piece.

The second through-orifice 62 includes a first section 62.1 at the level of the first transverse face 56, a spot facing 62.2 at the level of the second transverse face 58, a second section 62.3 between the first section and the spot facing 62.1, 62.2 having a diameter greater than that of the first section 62.1 and less than that of the spot facing 62.2, and a transverse bearing face 62.4 connecting the first and second sections 62.1, 62.3.

In accordance with one embodiment, the intercalated pipe 30 is connected to the second support 54 or to the exterior skin 16 by a demountable sealed connection 68 accommodated in the second section 62.3 of the second through-orifice 62. In accordance with one configuration, the intercalated pipe 30 includes a tubular extension 70 that includes a first tubular portion 70.1 cooperating with the second end section 30.2 of the intercalated pipe 30, a second tubular portion 70.2 extending the first tubular portion 70.1, and a ring 70.3 projecting from the exterior face of the tubular portions 70.1, 70.2 and substantially perpendicular to that exterior face.

In accordance with one arrangement, the first tubular portion 70.1 is fitted inside or outside the second end section 30.2 of the intercalated pipe 30 and connected to the latter by a permanent peripheral sealed connection 72 such as a peripheral weld bead, for example.

The ring 70.3 is configured to be pressed against the second support 54, to be more specific against its boss 64. To reinforce the seal the sealed demountable connection 68 includes an O-ring 74 intercalated between the ring 70.3 and the second support 54.

The second tubular portion 70.2 is configured to be able to be accommodated at least partially in the second through-orifice 62. To this end it has an outside diameter slightly less than that of the first section 62.1 of the second through-orifice 62 of the second support 54.

In accordance with one configuration, the demountable connection 68 includes a thread 68.1 at the level of the external face of the second tubular portion 70.2 of the tubular extension 70 of the intercalated pipe 30 and a nut 68.2 configured to be screwed onto the external face of the second tubular portion 70.2 of the tubular extension 70 and to come to bear against the second support 54, in particular the transverse bearing face 62.4. The demountable connection includes a system for preventing unintentional unscrewing of the nut 68.2, such as an anti-rotation ring 68.3, for example.

Of course, the invention is not limited to this embodiment of the sealed demountable connection 68 connecting the intercalated pipe 30 and the second support 54 and/or the exterior skin 16. Thus the intercalated pipe 30 and the tubular extension 70 could be in one piece.

In accordance with one embodiment, the second plug 28 takes the form of a disk that has a first end face 76.1 configured to be pressed against the second transverse face 58 of the second support 54, a second end face 76.2 opposite the first end face 76.1, and a cylindrical lateral face 76.3 connecting the first and second end faces 76.1, 76.2 and having a diameter substantially equal to that of the cylindrical lateral face 60 of the second support 54. To facilitate centering the second plug 28 relative to the second support 54, the second plug 28 includes a boss 78 projecting relative to the first end face 76.1 and configured to be accommodated without clearance in the spot facing 62.2 of the second through-orifice 62 of the second support 54.

The inspection device includes a sealed demountable connection 80 for connecting the second plug 28 and the second support 54. In accordance with one configuration the demountable connection includes a plurality of screws 80.1 that pass through the second plug 28 and are screwed into the second support 54. To reinforce the seal between the second plug 28 and the second support 54, the sealed demountable connection 80 includes an O-ring 82 intercalated between the spot facing 62.2 of the second support 54 and the boss 78 of the second plug 28.

Regardless of the embodiment, the first and second orifices 22, 24, the first and second through-orifices 40, 62 and the intercalated pipe 30 are sized to enable the passage of an endoscopic video camera.

In accordance with one configuration, the inspection device 20 includes a purging system 84 configured to control the pressure in the passage zone 32.

In accordance with one configuration, the purging system 84 is fastened to the second plug 28. It includes a valve 86 having an inlet 86.1 communicating with the passage zone 32 when the second plug 28 occupies the mounted first state and an outlet 86.2 configured to be connected to vacuum apparatus 88 (visible in FIG. 6) or blocked by a plug 90 (visible in FIG. 2). In accordance with one embodiment the second plug 28 includes a tubular extension 92 projecting relative to the second end face 76.2 having a free end 92.1 distant from the second end face 76.2 and a pipe 94 discharging on the first end face 76.1 of the second plug 28 and at the free end 92.1 of the tubular extension 92. At the free end 92.1 the pipe 94 has a threaded end 94.1 for screwing it to the inlet 86.1 of the valve 86.

Additionally, the valve 86 includes a control member 86.3, such as a knurled wheel, for example, configured to control the flow of a fluid between the inlet 86.1 and the outlet 86.2 by occupying a closed state or a more or less passing state.

In accordance with one embodiment, the inspection device 20 includes at least one insulation 96 positioned in the passage zone 32. In accordance with one configuration the insulation 96 comprises a plurality of MLI (multilayer insulation) type insulation layers 96.1 of disk shape each having a diameter equal to or slightly less than that of the intercalated pipe 30. Additionally, the insulation 96 includes a tubular insulation 96.2 fitted in the intercalated pipe 30 and intercalated between the insulating layers 96.1 and the second plug 28.

In accordance with one arrangement, the inspection device 20 includes a mobile support 98 to which is connected the insulation 96, more particularly the insulating layers 96.1, configured to insert the insulation 96 in the passage zone 32 or to extract it therefrom.

This mobile support 98 includes a rod 98.1 onto which the various layers 96.1 of insulation are threaded, a base 98.2 fastened to a first end of the rod 98.1, and a head 98.3 fastened to a second end of the rod 98.1. The head 98.3 is connected to the rod 98.1 by a demountable connection. For example, the head 98.3 is configured to be screwed onto the second end of the rod 98.1. With the head 98.3 separated from the rod 98.1 the insulating layers 96.1 are threaded onto the rod 98.1. Once the insulating layers 96.1 have been positioned around the rod 98.1 the head 98.3 is screwed onto the rod 98.1.

The head 98.3 is configured to provide a good grip in order to enable easy manipulation of the support 98 and of the insulation 96 and immobilization of the insulation 96 against vertical movement in translation.

The inspection device includes a demountable connection 100 configured to connect the mobile support 98 to the first plug 26 and/or to the first support 34. For example, the base 98.2 may be clipped onto the first plug 26 and/or screwed onto the first support 34. Of course, the invention is not limited to this way of obtaining the demountable connection 100.

The assembly of a double-skin tank equipped with an inspection device is described with reference to FIGS. 3 to 6. In a first step depicted in FIG. 3, the interior skin 12 not being positioned in the exterior skin 16, the first support 34 is fixed to the interior skin 12, the intercalated pipe 30 is connected to the first support 34 and the first plug 26 is screwed into the first support 34. The fact that the interior skin 12 is not inserted in the exterior skin 16 makes it possible to render more accessible the zones in which the sealed permanent connections 41 and 52 are made. A clamping tool 102 is used to screw the first plug 26 onto the first support 34 in order to guarantee an optimum seal between the first plug 26 and the first support 34. The tubular insulation 31 is positioned around the intercalated pipe 30.

Next, as depicted in FIG. 4, the intercalated pipe 30 is compressed using a compression tool 104 that cooperates with the first support 34 and compresses the intercalated pipe 30. In the presence of a tubular insulation 31 the compression tool 104 cooperates with the tubular insulation 31 and enables compression thereof simultaneously with that of the tubular pipe 30. Compressing the intercalated pipe 30 and the tubular insulation 31 enables its length to be reduced in the radial direction and simplifies the insertion of the interior skin 12 in the exterior skin 16.

After the interior skin 12 has been placed in the exterior skin 16 the compression tool 104 is removed. The intercalated pipe 30 and the tubular insulation 31 automatically revert to their length in the first state and the second tubular portion 70.2 of the tubular extension 70 of the intercalated pipe 30 passes partially through the second support 54. The demountable connection 68 is assembled in order to connect the intercalated pipe 30 and the second support 54, as depicted in FIG. 5. Next, the mobile support 98 and the insulation 96 are inserted in the passage zone 32 after which the second plug 28 is connected to the second support 54 by means of the sealed demountable connection 80.

Figure 6:
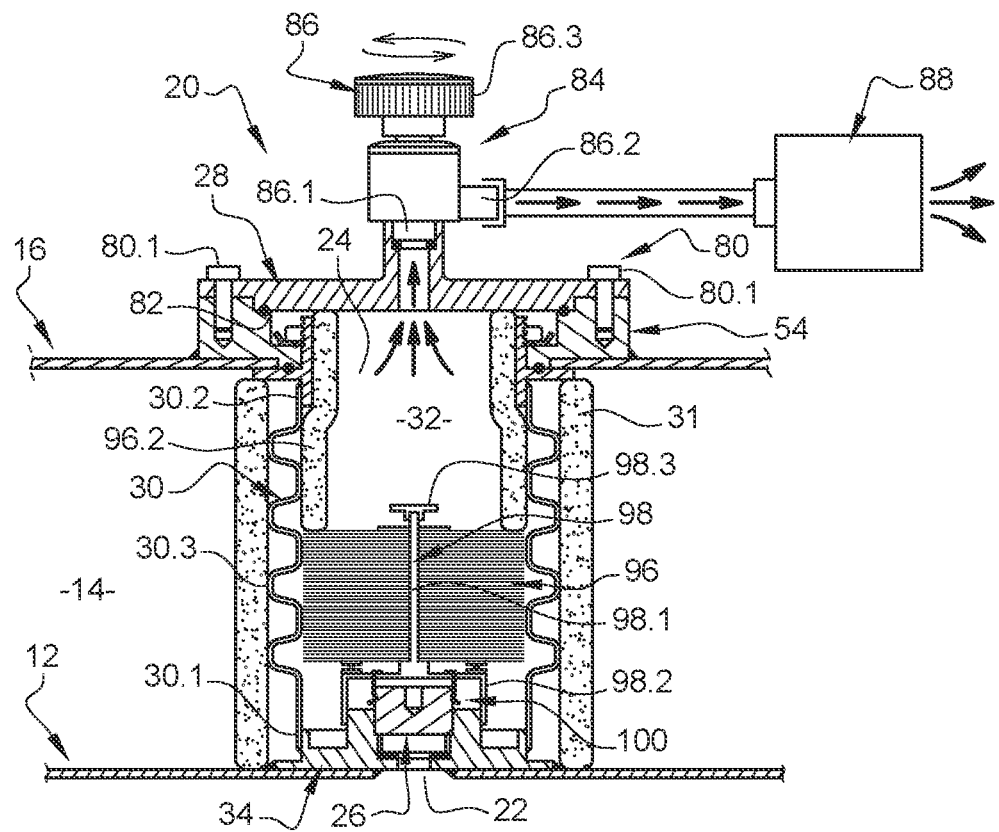
FIG. 6 is a view in section of the inspection device visible in FIG. 2 depicting a step of establishing a vacuum.

Finally, as depicted in FIG. 6, to reduce the pressure in the passage zone 32 the valve 86 is opened and its outlet 86.2 is connected to a vacuum apparatus 88. When the passage zone 32 is at a level of vacuum substantially equal to that of the intercalated zone 14, of the order of 10-7 to 10-11 bar, the valve 86 is closed and the vacuum apparatus 88 is disconnected from the outlet 86.2 The plug 90 is then fitted to block the outlet 86.2.

The tank 10 is then ready for use.

The method using the inspection device 20 to carry out an inspection is described with reference to FIGS. 7 to 10.

Figure 7:
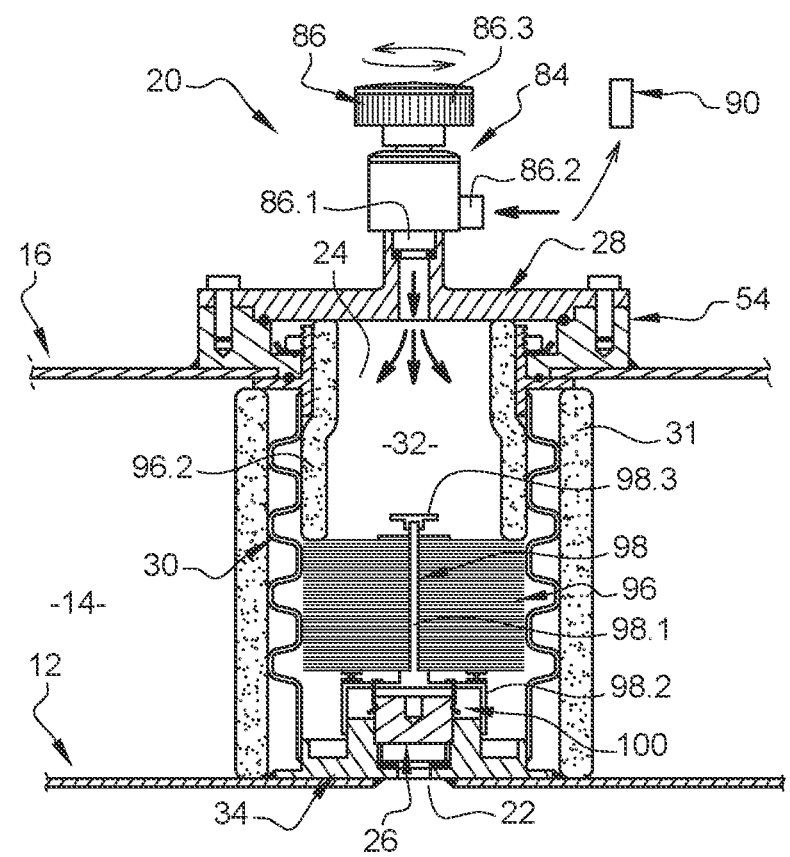
FIG. 7 is a view in section of the inspection device visible in FIG. 2 depicting a step of admitting air prior to inspection.

In a first stage, as depicted in FIG. 7, the plug 90 is removed from the outlet 86.2 and the valve 86 is opened so that the passage zone 32 is at atmospheric pressure.

Figure 8:
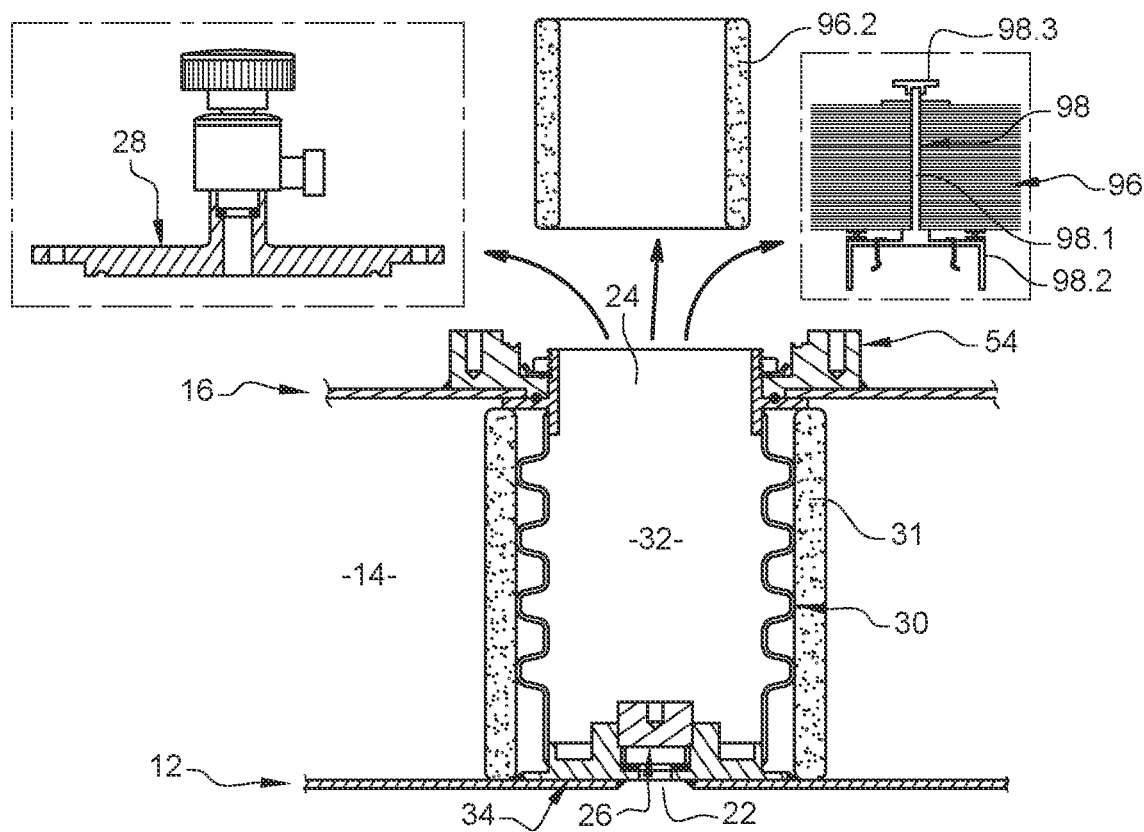
FIG. 8 is a view in section of the inspection device visible in FIG. 2 depicting first demounting steps prior to inspection.

Next, the second plug 28 is demounted after which the mobile support 98 and the insulation 96 are removed from the passage zone 32 as depicted in FIG. 8.

Figure 9:
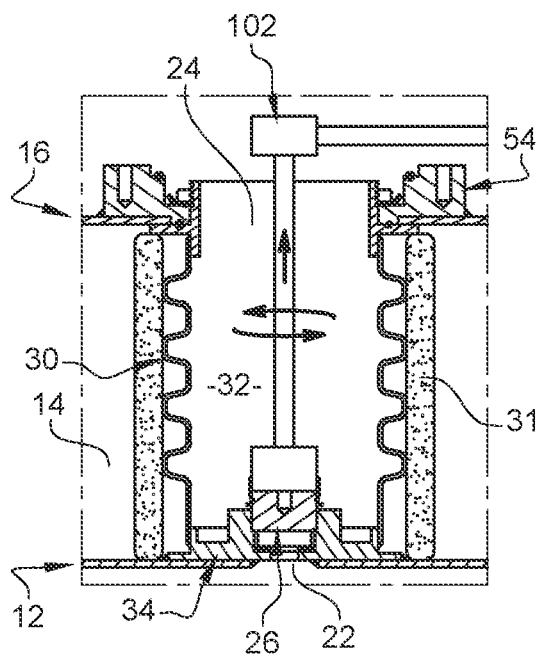
FIG. 9 is a view in section of the inspection device visible in FIG. 2 depicting a final demounting step prior to inspection.
Figure 10:
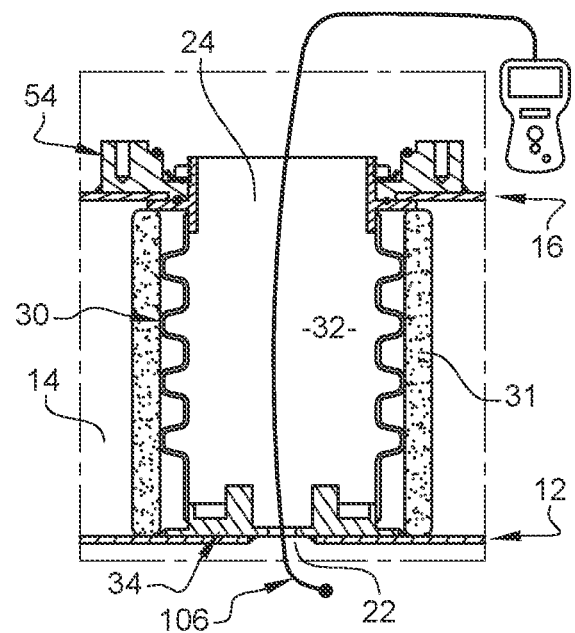
FIG. 10 is a view in section of the inspection device visible in FIG. 2 during inspection.

The first plug 26 is then unscrewed using the clamping tool 102 as depicted in FIG. 9. Finally, an endoscopic video camera 106 can be introduced into the tank 10 in order to inspect the interior skin 12, in particular as depicted in FIG. 10.

Following the inspection, the first plug 26 is screwed back on, the mobile support 98 and the insulation 96 are reintroduced into the passage zone 32 and the second plug 28 is then remounted. Finally, the passage zone 32 is placed under vacuum, as described above.

The inspection device 20 provides a simple way to inspect the interior of the tank 10 without needing to demount the system for connecting the outlet pipe of the tank 10. This inspection device 20 also makes it possible to avoid degrading the seal and the thermal insulation of the tank 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising an interior skin, an exterior skin and an intercalated zone between the interior and exterior skins, the interior and exterior skins delimiting an interior zone in contact with the interior skin and an exterior zone in contact with the exterior skin, wherein the tank includes at least one inspection device comprising:
   a first orifice configured to establish communication between the interior zone and the intercalated zone via the interior skin,
   a second orifice configured to establish communication between the intercalated zone and the exterior zone via the exterior skin, the first and second orifices being aligned in a radial direction,
   a first plug configured to occupy a mounted first state in which the first plug prevents any flow through the first orifice and a demounted second state in which the first plug enables access through the first orifice,
   a second plug configured to occupy a mounted first state in which the second plug prevents any flow through the second orifice and a demounted second state in which the second plug enables access through the second orifice, and
   an intercalated pipe positioned in the intercalated zone, having a first end section connected to the interior skin and communicating with the first orifice, a second end section connected to the exterior skin and communicating with the second orifice, and an intercalated section forming a bellows configured to be deformed in the radial direction,
   wherein the at least one inspection device includes a permanently sealed connection connecting the intercalated pipe and a first support fastened to the interior skin or the exterior skin and a sealed demountable connection connecting the intercalated pipe and second support fastened to the interior skin or the exterior skin.

2. The tank as claimed in claim 1, wherein the at least one inspection device includes insulation positioned in a passage zone delimited by the intercalated pipe.

3. The tank as claimed in claim 2, wherein the at least one inspection device includes a mobile support to which the insulation is connected configured to insert the insulation in the passage zone or to extract the insulation therefrom.

4. The tank as claimed in claim 3, wherein the at least one inspection device includes a demountable connection configured to connect the mobile support to at least one of the first plug or the first support fastened to the interior skin.

5. The tank as claimed in claim 1, wherein the at least one inspection device includes a purging system configured to control pressure in a passage zone delimited by the intercalated pipe and the first and second plugs in the mounted first state.

6. The tank as claimed in claim 5, wherein the purging system includes a valve having an inlet that communicates with the passage zone when the second plug occupies the mounted first state, an outlet and a control member configured to control a flow of fluid between the inlet and the outlet.

7. The tank as claimed in claim 1,
wherein an interior wall of the tank has an internal face oriented toward the interior zone and an external face oriented toward the intercalated zone, and
wherein the first support is connected by at least one permanent sealed connection to the interior skin and has a first transverse face pressed against the external face of the interior skin, a second transverse face opposite the first transverse face, a lateral surface including at least one section configured to cooperate with the first end section of the intercalated pipe, and a first through-orifice discharging on the first and second transverse faces, communicating with the first orifice and configured to cooperate with the first plug.

8. The tank as claimed in claim 7,
wherein the first through-orifice has a first section discharging on the first transverse face, a second section discharging on the second transverse face which has a diameter greater than that of the first section, and a transverse bearing face connecting the first and second sections,
wherein the first plug includes a cylindrical body extending between first and second end faces connected by a lateral face configured to cooperate with the second section of the first through-orifice of the first support, the first end face being oriented toward the transverse bearing face of the first through-orifice when the first plug is in the mounted first state, and
wherein the inspection device includes an annular seal intercalated between the first end face of the first plug and the transverse bearing face of the first through-orifice of the first support.

9. The tank as claimed in claim 8,
wherein the second section of the first through-orifice is threaded, and
wherein the lateral face of the first plug has a first section adjacent to the first end face that has a greater diameter than the first section of the first through-orifice and a smaller diameter than the second section of the first through-orifice and a second section adjacent to the second end face, at least partially threaded and configured to be screwed into the second section of the first through-orifice.

10. The tank as claimed in claim 9, wherein the second section of the lateral face includes an annular groove to enable an element to be clipped on.

11. The tank as claimed in claim 9, wherein the first plug includes an imprint on the second end face to enable the first plug to be screwed into the first through-orifice.

12. The tank as claimed in claim 1,
wherein the exterior skin has an internal face oriented toward the intercalated zone and an external face oriented toward the exterior zone, and
wherein the second support is connected by at least one sealed permanent connection to the exterior skin and has a first transverse face pressed against the external face of the exterior skin, a second transverse face opposite the first transverse face, and a second through-orifice discharging on the first and second transverse faces and communicating with the second orifice, the second plug being configured to be pressed against the second transverse face and connected to the second support by a sealed demountable connection.

13. The tank as claimed in claim 12,
wherein the second through-orifice includes a first section at a level of the first transverse face and a second section having a diameter greater than that of the first section configured to accommodate the sealed and demountable connection and a transverse bearing face connecting the first and second sections, wherein the intercalated pipe has a tubular extension including a tubular portion configured to be accommodated at least partially in the second orifice, and wherein the sealed demountable connection includes a thread at the level of the tubular portion of the tubular extension of the intercalated pipe and a nut configured to be screwed onto the tubular portion of the tubular extension and to bear against the transverse bearing face of the second support.

14. The tank as claimed in claim 13, wherein the tubular extension includes a first tubular portion cooperating with the second end section of the intercalated pipe, a second tubular portion cooperating with the nut of the sealed demountable connection, and a ring configured to be pressed against the second support, and wherein the sealed demountable connection includes a seal intercalated between the ring and the second support.

\* \* \* \* \*